(12) United States Patent
Blomgren et al.

(10) Patent No.: US 10,933,592 B2
(45) Date of Patent: Mar. 2, 2021

(54) METHOD AND DEVICE FOR INSERTING A TONGUE

(71) Applicant: VÄLINGE INNOVATION AB, Viken (SE)

(72) Inventors: Andreas Blomgren, Ljugskile (SE); Jonas Fransson, Allerum (SE)

(73) Assignee: VALINGE INNOVATION AB, Viken (SE)

( * ) Notice: Subject to any disclaimer, the term of this patent is extended or adjusted under 35 U.S.C. 154(b) by 100 days.

(21) Appl. No.: 15/635,619

(22) Filed: Jun. 28, 2017

(65) Prior Publication Data

US 2018/0001573 A1    Jan. 4, 2018

(30) Foreign Application Priority Data

Jun. 29, 2016  (SE) ................................. 1650938-2

(51) Int. Cl.
| | | |
|---|---|---|
| *B29C 65/56* | (2006.01) | |
| *F16B 12/20* | (2006.01) | |
| *B29L 31/44* | (2006.01) | |
| *B29C 65/00* | (2006.01) | |

(52) U.S. Cl.
CPC .......... *B29C 66/124* (2013.01); *B29C 65/565* (2013.01); *B29C 66/7487* (2013.01); *B29C 66/824* (2013.01); *F16B 12/20* (2013.01); *A47B 2230/0081* (2013.01); *A47B 2230/0096* (2013.01); *B29L 2031/44* (2013.01)

(58) Field of Classification Search
CPC .... B29C 66/124; B25C 1/001; B27M 3/0006; B23Q 7/10; B23P 19/001; Y10T 29/53748

USPC .......................................................... 221/251
See application file for complete search history.

(56) References Cited

U.S. PATENT DOCUMENTS

| | | | |
|---|---|---|---|
| 1,194,636 A | 8/1916 | Joy | |
| 1,902,716 A | 3/1933 | Newton | |
| 3,114,477 A * | 12/1963 | Dixon | ................... B23P 19/006 221/238 |
| 3,147,522 A | 9/1964 | Schumm | |
| 3,381,730 A | 5/1968 | Omholt | |
| 3,572,224 A | 3/1971 | Perry | |
| 3,579,941 A | 5/1971 | Tibbals | |

(Continued)

FOREIGN PATENT DOCUMENTS

| | | |
|---|---|---|
| DE | 25 05 489 A1 | 8/1976 |
| DE | 197 52 286 A1 | 5/1999 |

(Continued)

OTHER PUBLICATIONS

Machine Translation of EP226614B1 (Year: 2011).*

(Continued)

*Primary Examiner* — David P Bryant
*Assistant Examiner* — Michael W Hotchkiss
(74) *Attorney, Agent, or Firm* — Buchanan Ingersoll & Rooney P.C.

(57) ABSTRACT

A method and device for inserting a tongue in an insertion groove in a panel by a device, wherein the method includes: displacing a tongue guiding device in a first direction by displacing a puncher in the first direction, and displacing a tongue between a first part and a second part of the tongue guiding device and into an insertion groove in panel by further displacing the puncher.

14 Claims, 7 Drawing Sheets

(56) References Cited

U.S. PATENT DOCUMENTS

| | | | |
|---|---|---|---|
| 3,584,761 A * | 6/1971 | Flanigan | B23Q 7/00 221/276 |
| 3,720,027 A | 3/1973 | Christensen | |
| 3,760,485 A * | 9/1973 | Smith | B23P 19/006 29/813 |
| 3,760,547 A | 9/1973 | Brenneman | |
| 3,778,954 A | 12/1973 | Meserole | |
| 3,919,820 A | 11/1975 | Green | |
| 3,930,808 A * | 1/1976 | Miller | B23P 19/069 29/809 |
| 3,961,408 A * | 6/1976 | Goodsmith | B23P 19/006 29/706 |
| 4,048,105 A | 9/1977 | Salisbury | |
| 4,648,165 A | 3/1987 | Whitehorne | |
| 4,899,438 A * | 2/1990 | Muller | B25B 23/08 221/167 |
| 5,105,980 A * | 4/1992 | Hofmann | B23Q 7/106 221/185 |
| 5,174,022 A | 12/1992 | Phillips et al. | |
| 5,582,611 A * | 12/1996 | Tsuruta | A61B 17/00234 606/46 |
| 5,636,426 A * | 6/1997 | Luckhardt | B21J 15/32 29/432 |
| 5,810,239 A | 9/1998 | Stich | |
| 5,996,876 A | 12/1999 | Dickhoff et al. | |
| 6,098,442 A * | 8/2000 | Walldorf | B21J 15/32 227/136 |
| 6,273,315 B1 * | 8/2001 | McGuinness | B25C 5/1693 206/445 |
| 6,314,701 B1 | 11/2001 | Meyerson | |
| 6,363,677 B1 | 4/2002 | Chen et al. | |
| 6,385,936 B1 | 5/2002 | Schneider | |
| 6,418,683 B1 | 7/2002 | Martensson et al. | |
| 6,446,413 B1 | 9/2002 | Gruber | |
| 6,490,836 B1 | 12/2002 | Moriau et al. | |
| 6,505,452 B1 | 1/2003 | Hannig | |
| 6,592,015 B1 * | 7/2003 | Gostylla | B25B 23/04 227/112 |
| 6,631,827 B2 * | 10/2003 | Goodsmith | B23P 19/006 221/238 |
| 6,647,690 B1 | 11/2003 | Martensson | |
| 6,651,400 B1 | 11/2003 | Murphy | |
| 6,655,573 B1 * | 12/2003 | Chang | B25B 23/045 227/109 |
| 6,763,643 B1 | 7/2004 | Martensson | |
| 6,766,622 B1 | 7/2004 | Thiers | |
| 6,769,835 B2 | 8/2004 | Stridsman | |
| 6,804,926 B1 | 10/2004 | Eisermann | |
| 6,807,719 B2 | 10/2004 | Herr et al. | |
| 6,854,235 B2 | 2/2005 | Martensson | |
| 6,880,307 B2 | 4/2005 | Schwitte et al. | |
| 7,040,068 B2 | 5/2006 | Moriau et al. | |
| 7,051,486 B2 | 5/2006 | Pervan | |
| 7,188,456 B2 | 3/2007 | Knauseder | |
| 7,451,578 B2 | 11/2008 | Hannig | |
| 7,454,875 B2 | 11/2008 | Pervan et al. | |
| 7,568,322 B2 | 8/2009 | Pervan | |
| 7,584,583 B2 | 9/2009 | Bergelin et al. | |
| 7,614,197 B2 | 11/2009 | Nelson | |
| 7,617,651 B2 | 11/2009 | Grafenauer | |
| 7,621,092 B2 | 11/2009 | Groeke et al. | |
| 7,634,884 B2 | 12/2009 | Pervan | |
| 7,637,068 B2 | 12/2009 | Pervan | |
| 7,677,005 B2 | 3/2010 | Pervan | |
| 7,721,503 B2 | 5/2010 | Pervan et al. | |
| 7,757,452 B2 | 7/2010 | Pervan | |
| 7,802,411 B2 | 9/2010 | Pervan | |
| 7,811,150 B2 | 11/2010 | Pervan | |
| 7,841,144 B2 | 11/2010 | Pervan et al. | |
| 7,841,145 B2 | 11/2010 | Pervan et al. | |
| 7,856,789 B2 | 12/2010 | Eisermann | |
| 7,861,482 B2 | 1/2011 | Pervan et al. | |
| 7,866,110 B2 | 1/2011 | Pervan | |
| 7,908,815 B2 | 3/2011 | Pervan et al. | |
| 7,908,816 B2 | 3/2011 | Grafenauer | |
| 7,930,862 B2 | 4/2011 | Bergelin et al. | |
| 7,980,041 B2 | 7/2011 | Pervan | |
| 8,033,074 B2 | 10/2011 | Pervan | |
| 8,042,311 B2 | 10/2011 | Pervan | |
| 8,061,104 B2 | 11/2011 | Pervan | |
| 8,079,196 B2 | 12/2011 | Pervan | |
| 8,091,238 B2 * | 1/2012 | Hannig | F16B 5/0056 29/897.32 |
| 8,112,967 B2 | 2/2012 | Pervan et al. | |
| 8,171,692 B2 | 5/2012 | Pervan | |
| 8,181,416 B2 | 5/2012 | Pervan et al. | |
| 8,234,830 B2 | 8/2012 | Pervan et al. | |
| 8,256,104 B2 * | 9/2012 | Fulbright | B21J 15/043 29/243.521 |
| 8,341,914 B2 | 1/2013 | Pervan et al. | |
| 8,341,915 B2 * | 1/2013 | Pervan | E04F 15/02038 52/586.2 |
| 8,353,140 B2 | 1/2013 | Pervan et al. | |
| 8,359,805 B2 | 1/2013 | Pervan et al. | |
| 8,381,476 B2 | 2/2013 | Hannig | |
| 8,381,477 B2 | 2/2013 | Pervan et al. | |
| 8,387,327 B2 | 3/2013 | Pervan | |
| 8,448,402 B2 | 5/2013 | Pervan et al. | |
| 8,499,521 B2 | 8/2013 | Pervan et al. | |
| 8,505,257 B2 | 8/2013 | Boo et al. | |
| 8,528,289 B2 | 9/2013 | Pervan et al. | |
| 8,544,230 B2 | 10/2013 | Pervan | |
| 8,544,234 B2 | 10/2013 | Pervan et al. | |
| 8,572,922 B2 | 11/2013 | Pervan | |
| 8,596,013 B2 | 12/2013 | Boo | |
| 8,627,862 B2 * | 1/2014 | Pervan | E04F 15/02 144/359 |
| 8,640,424 B2 | 2/2014 | Pervan et al. | |
| 8,650,738 B2 * | 2/2014 | Schulte | B27M 3/0066 29/451 |
| 8,650,826 B2 | 2/2014 | Pervan et al. | |
| 8,677,714 B2 | 3/2014 | Pervan | |
| 8,689,512 B2 | 4/2014 | Pervan | |
| 8,707,650 B2 | 4/2014 | Pervan | |
| 8,713,886 B2 | 5/2014 | Boo et al. | |
| 8,733,065 B2 | 5/2014 | Pervan | |
| 8,733,410 B2 | 5/2014 | Pervan | |
| 8,763,340 B2 * | 7/2014 | Pervan | E04F 15/04 52/582.2 |
| 8,763,341 B2 | 7/2014 | Pervan | |
| 8,769,905 B2 | 7/2014 | Pervan | |
| 8,776,473 B2 | 7/2014 | Pervan et al. | |
| 8,844,236 B2 | 9/2014 | Pervan et al. | |
| 8,857,126 B2 | 10/2014 | Pervan et al. | |
| 8,869,485 B2 | 10/2014 | Pervan | |
| 8,898,988 B2 | 12/2014 | Pervan | |
| 8,925,274 B2 | 1/2015 | Pervan et al. | |
| 8,959,866 B2 | 2/2015 | Pervan | |
| 8,973,331 B2 | 3/2015 | Boo | |
| 9,027,306 B2 | 5/2015 | Pervan | |
| 9,051,738 B2 | 6/2015 | Pervan et al. | |
| 9,068,360 B2 | 6/2015 | Pervan | |
| 9,091,077 B2 | 7/2015 | Boo | |
| 9,120,141 B2 * | 9/2015 | Clew | B21J 15/323 |
| 9,194,134 B2 | 11/2015 | Nygren et al. | |
| 9,212,492 B2 | 12/2015 | Pervan et al. | |
| 9,216,541 B2 | 12/2015 | Boo et al. | |
| 9,238,917 B2 | 1/2016 | Pervan et al. | |
| 9,284,737 B2 | 3/2016 | Pervan et al. | |
| 9,309,679 B2 | 4/2016 | Pervan et al. | |
| 9,316,002 B2 | 4/2016 | Boo | |
| 9,340,974 B2 * | 5/2016 | Pervan | B27F 1/08 |
| 9,347,469 B2 * | 5/2016 | Pervan | E04F 15/02038 |
| 9,359,774 B2 | 6/2016 | Pervan | |
| 9,366,036 B2 | 6/2016 | Pervan | |
| 9,376,821 B2 | 6/2016 | Pervan et al. | |
| 9,382,716 B2 | 7/2016 | Pervan et al. | |
| 9,388,584 B2 | 7/2016 | Pervan et al. | |
| 9,428,919 B2 | 8/2016 | Pervan et al. | |
| 9,453,347 B2 | 9/2016 | Pervan et al. | |
| 9,458,634 B2 | 10/2016 | Derelov | |
| 9,482,012 B2 | 11/2016 | Nygren et al. | |
| 9,540,826 B2 | 1/2017 | Pervan et al. | |

(56) References Cited

U.S. PATENT DOCUMENTS

| | | | |
|---|---|---|---|
| 9,555,529 B2 * | 1/2017 | Ronconi | B25C 1/001 |
| 9,663,940 B2 | 5/2017 | Boo | |
| 9,725,912 B2 | 8/2017 | Pervan | |
| 9,771,723 B2 | 9/2017 | Pervan | |
| 9,777,487 B2 | 10/2017 | Pervan et al. | |
| 9,803,374 B2 | 10/2017 | Pervan | |
| 9,803,375 B2 | 10/2017 | Pervan | |
| 9,856,656 B2 | 1/2018 | Pervan | |
| 9,874,027 B2 | 1/2018 | Pervan | |
| 9,945,130 B2 | 4/2018 | Nygren et al. | |
| 9,951,526 B2 | 4/2018 | Boo et al. | |
| 10,006,210 B2 | 6/2018 | Pervan et al. | |
| 10,017,948 B2 | 7/2018 | Boo | |
| 10,113,319 B2 | 10/2018 | Pervan | |
| 10,125,488 B2 | 11/2018 | Boo | |
| 10,138,636 B2 | 11/2018 | Pervan | |
| 10,161,139 B2 | 12/2018 | Pervan | |
| 10,180,005 B2 | 1/2019 | Pervan et al. | |
| 10,214,915 B2 | 2/2019 | Pervan et al. | |
| 10,214,917 B2 | 2/2019 | Pervan et al. | |
| 10,240,348 B2 | 3/2019 | Pervan et al. | |
| 10,240,349 B2 | 3/2019 | Pervan et al. | |
| 10,246,883 B2 | 4/2019 | Derelöv | |
| 10,307,815 B2 * | 6/2019 | Badent | B21J 15/025 |
| 10,352,049 B2 | 7/2019 | Boo | |
| 10,358,830 B2 | 7/2019 | Pervan | |
| 10,378,217 B2 | 8/2019 | Pervan | |
| 10,458,125 B2 | 10/2019 | Pervan | |
| 10,526,792 B2 | 1/2020 | Pervan et al. | |
| 10,538,922 B2 | 1/2020 | Pervan | |
| 10,570,625 B2 | 2/2020 | Pervan | |
| 10,640,989 B2 | 5/2020 | Pervan | |
| 10,655,339 B2 | 5/2020 | Pervan | |
| 10,669,723 B2 | 6/2020 | Pervan et al. | |
| 10,794,065 B2 | 10/2020 | Boo et al. | |
| 10,828,798 B2 | 11/2020 | Fransson | |
| 2002/0031646 A1 | 3/2002 | Chen et al. | |
| 2002/0170259 A1 | 11/2002 | Ferris | |
| 2002/0178674 A1 | 12/2002 | Pervan | |
| 2003/0009971 A1 | 1/2003 | Palmberg | |
| 2003/0024199 A1 | 2/2003 | Pervan et al. | |
| 2003/0037504 A1 | 2/2003 | Schwitte et al. | |
| 2003/0180091 A1 | 9/2003 | Stridsman | |
| 2003/0188504 A1 | 10/2003 | Ralf | |
| 2003/0196405 A1 | 10/2003 | Pervan | |
| 2004/0016196 A1 | 1/2004 | Pervan | |
| 2004/0031227 A1 | 2/2004 | Knauseder | |
| 2004/0060255 A1 | 4/2004 | Knauseder | |
| 2004/0068954 A1 | 4/2004 | Martensson | |
| 2004/0123548 A1 | 7/2004 | Gimpel et al. | |
| 2004/0128934 A1 | 7/2004 | Hecht | |
| 2004/0200175 A1 | 10/2004 | Weber | |
| 2004/0211143 A1 | 10/2004 | Hanning | |
| 2004/0244325 A1 | 12/2004 | Nelson | |
| 2004/0261348 A1 | 12/2004 | Vulin | |
| 2005/0081373 A1 * | 4/2005 | Seidler | B25B 23/045 |
| | | | 29/811.2 |
| 2005/0160694 A1 | 7/2005 | Pervan | |
| 2005/0205161 A1 | 9/2005 | Lewark | |
| 2005/0210810 A1 | 9/2005 | Pervan | |
| 2006/0070333 A1 | 4/2006 | Pervan | |
| 2006/0101769 A1 | 5/2006 | Pervan | |
| 2006/0162814 A1 | 7/2006 | Symossek et al. | |
| 2006/0236642 A1 | 10/2006 | Pervan | |
| 2006/0260254 A1 | 11/2006 | Pervan et al. | |
| 2007/0006543 A1 | 1/2007 | Engström | |
| 2007/0011981 A1 | 1/2007 | Eiserman | |
| 2007/0028547 A1 | 2/2007 | Grafenauer | |
| 2007/0151189 A1 | 7/2007 | Yang et al. | |
| 2007/0175156 A1 | 8/2007 | Pervan et al. | |
| 2007/0193178 A1 | 8/2007 | Groeke et al. | |
| 2008/0000180 A1 | 1/2008 | Pervan et al. | |
| 2008/0000187 A1 | 1/2008 | Pervan et al. | |
| 2008/0010931 A1 | 1/2008 | Pervan et al. | |
| 2008/0010937 A1 | 1/2008 | Pervan et al. | |
| 2008/0028707 A1 | 2/2008 | Pervan | |
| 2008/0034708 A1 | 2/2008 | Pervan | |
| 2008/0041008 A1 | 2/2008 | Pervan | |
| 2008/0066415 A1 | 3/2008 | Pervan | |
| 2008/0104921 A1 | 5/2008 | Pervan et al. | |
| 2008/0110125 A1 | 5/2008 | Pervan | |
| 2008/0134607 A1 | 6/2008 | Pervan | |
| 2008/0134613 A1 | 6/2008 | Pervan | |
| 2008/0134614 A1 | 6/2008 | Pervan | |
| 2008/0155930 A1 | 7/2008 | Pervan et al. | |
| 2008/0216434 A1 | 9/2008 | Pervan | |
| 2008/0216920 A1 | 9/2008 | Pervan | |
| 2008/0295432 A1 | 12/2008 | Pervan et al. | |
| 2009/0133353 A1 | 5/2009 | Pervan et al. | |
| 2009/0193748 A1 | 8/2009 | Boo et al. | |
| 2010/0043333 A1 | 2/2010 | Hannig et al. | |
| 2010/0218360 A1 * | 9/2010 | Mangone, Jr. | F24D 3/14 |
| | | | 29/525.01 |
| 2010/0293879 A1 | 11/2010 | Pervan et al. | |
| 2010/0300031 A1 | 12/2010 | Pervan et al. | |
| 2010/0313714 A1 | 12/2010 | Smith | |
| 2010/0319290 A1 | 12/2010 | Pervan | |
| 2010/0319291 A1 | 12/2010 | Pervan et al. | |
| 2011/0030303 A1 | 2/2011 | Pervan et al. | |
| 2011/0041996 A1 | 2/2011 | Pervan | |
| 2011/0088344 A1 | 4/2011 | Pervan et al. | |
| 2011/0088345 A1 | 4/2011 | Pervan | |
| 2011/0088346 A1 | 4/2011 | Hannig | |
| 2011/0094083 A1 | 4/2011 | Schulte | |
| 2011/0154763 A1 | 6/2011 | Bergelin et al. | |
| 2011/0167750 A1 | 7/2011 | Pervan | |
| 2011/0167751 A1 | 7/2011 | Engström | |
| 2011/0225922 A1 | 9/2011 | Pervan et al. | |
| 2011/0252733 A1 | 10/2011 | Pervan | |
| 2011/0283650 A1 | 11/2011 | Pervan et al. | |
| 2012/0017533 A1 | 1/2012 | Pervan et al. | |
| 2012/0031029 A1 | 2/2012 | Pervan et al. | |
| 2012/0036804 A1 | 2/2012 | Pervan | |
| 2012/0073235 A1 | 3/2012 | Hannig | |
| 2012/0151865 A1 | 6/2012 | Pervan et al. | |
| 2012/0174515 A1 | 7/2012 | Pervan | |
| 2012/0174520 A1 | 7/2012 | Pervan | |
| 2012/0279161 A1 | 11/2012 | Håkansson et al. | |
| 2013/0008117 A1 | 1/2013 | Pervan | |
| 2013/0014463 A1 | 1/2013 | Pervan | |
| 2013/0019555 A1 | 1/2013 | Pervan | |
| 2013/0042562 A1 | 2/2013 | Pervan | |
| 2013/0042563 A1 | 2/2013 | Pervan | |
| 2013/0042564 A1 | 2/2013 | Pervan et al. | |
| 2013/0042565 A1 | 2/2013 | Pervan | |
| 2013/0047536 A1 | 2/2013 | Pervan | |
| 2013/0081349 A1 | 4/2013 | Pervan et al. | |
| 2013/0111845 A1 | 5/2013 | Pervan | |
| 2013/0145708 A1 | 6/2013 | Pervan | |
| 2013/0160391 A1 | 6/2013 | Pervan et al. | |
| 2013/0232905 A2 | 9/2013 | Pervan | |
| 2013/0239508 A1 | 9/2013 | Pervan et al. | |
| 2013/0263454 A1 | 10/2013 | Boo et al. | |
| 2013/0263547 A1 | 10/2013 | Boo | |
| 2013/0318906 A1 | 12/2013 | Pervan et al. | |
| 2014/0007539 A1 | 1/2014 | Pervan et al. | |
| 2014/0020324 A1 | 1/2014 | Pervan | |
| 2014/0033634 A1 | 2/2014 | Pervan | |
| 2014/0042203 A1 | 2/2014 | Abe | |
| 2014/0053497 A1 | 2/2014 | Pervan et al. | |
| 2014/0059966 A1 | 3/2014 | Boo | |
| 2014/0069043 A1 | 3/2014 | Pervan | |
| 2014/0090335 A1 | 4/2014 | Pervan et al. | |
| 2014/0109501 A1 | 4/2014 | Pervan | |
| 2014/0109506 A1 | 4/2014 | Pervan et al. | |
| 2014/0123586 A1 | 5/2014 | Pervan et al. | |
| 2014/0138422 A1 | 5/2014 | Ronconi | |
| 2014/0150369 A1 | 6/2014 | Hannig | |
| 2014/0190112 A1 | 7/2014 | Pervan | |
| 2014/0208677 A1 | 7/2014 | Pervan et al. | |
| 2014/0207931 A1 | 8/2014 | Pervan | |
| 2014/0223852 A1 | 8/2014 | Pervan | |
| 2014/0237931 A1 | 8/2014 | Pervan | |
| 2014/0250813 A1 | 9/2014 | Nygren et al. | |

(56) References Cited

U.S. PATENT DOCUMENTS

| | | |
|---|---|---|
| 2014/0260060 A1 | 9/2014 | Pervan et al. |
| 2014/0305065 A1 | 10/2014 | Pervan |
| 2014/0338177 A1 | 11/2014 | Vermeulen et al. |
| 2014/0366476 A1 | 12/2014 | Pervan |
| 2014/0373478 A2 | 12/2014 | Pervan et al. |
| 2014/0373480 A1 | 12/2014 | Pervan et al. |
| 2015/0000221 A1 | 1/2015 | Boo |
| 2015/0013260 A1 | 1/2015 | Pervan |
| 2015/0059281 A1 | 3/2015 | Pervan |
| 2015/0089896 A2 | 4/2015 | Pervan et al. |
| 2015/0121796 A1 | 5/2015 | Pervan |
| 2015/0152644 A1 | 6/2015 | Boo |
| 2015/0167318 A1 | 6/2015 | Pervan |
| 2015/0211239 A1 | 7/2015 | Pervan |
| 2015/0233125 A1 | 8/2015 | Pervan et al. |
| 2015/0267419 A1 | 9/2015 | Pervan |
| 2015/0300029 A1 | 10/2015 | Pervan |
| 2015/0330088 A1 | 11/2015 | Derelöv |
| 2015/0336224 A1* | 11/2015 | Liu .................. B25C 1/00 29/809 |
| 2015/0337537 A1 | 11/2015 | Boo |
| 2016/0032596 A1 | 2/2016 | Nygren et al. |
| 2016/0060879 A1 | 3/2016 | Pervan |
| 2016/0069088 A1 | 3/2016 | Boo et al. |
| 2016/0076260 A1 | 3/2016 | Pervan et al. |
| 2016/0090744 A1 | 3/2016 | Pervan et al. |
| 2016/0129573 A1 | 5/2016 | Anstett et al. |
| 2016/0153200 A1 | 6/2016 | Pervan |
| 2016/0168866 A1 | 6/2016 | Pervan et al. |
| 2016/0186426 A1 | 6/2016 | Boo |
| 2016/0194884 A1 | 7/2016 | Pervan et al. |
| 2016/0201336 A1 | 7/2016 | Pervan |
| 2016/0251859 A1 | 9/2016 | Pervan et al. |
| 2016/0251860 A1 | 9/2016 | Pervan |
| 2016/0281368 A1 | 9/2016 | Pervan et al. |
| 2016/0281370 A1 | 9/2016 | Pervan et al. |
| 2016/0326751 A1 | 11/2016 | Pervan |
| 2016/0340913 A1 | 11/2016 | Derelöv |
| 2017/0037641 A1 | 2/2017 | Nygren et al. |
| 2017/0081860 A1 | 3/2017 | Boo |
| 2017/0254096 A1 | 9/2017 | Pervan |
| 2017/0321433 A1 | 11/2017 | Pervan et al. |
| 2017/0362834 A1 | 12/2017 | Pervan et al. |
| 2018/0001509 A1 | 1/2018 | Myllykangas et al. |
| 2018/0001510 A1 | 1/2018 | Fransson |
| 2018/0002933 A1 | 1/2018 | Pervan |
| 2018/0030737 A1 | 2/2018 | Pervan |
| 2018/0030738 A1 | 2/2018 | Pervan |
| 2018/0119431 A1 | 5/2018 | Pervan et al. |
| 2018/0178406 A1 | 6/2018 | Fransson et al. |
| 2019/0024387 A1 | 1/2019 | Pervan et al. |
| 2019/0048592 A1 | 2/2019 | Boo |
| 2019/0048596 A1 | 2/2019 | Pervan |
| 2019/0063076 A1 | 2/2019 | Boo et al. |
| 2019/0093370 A1 | 3/2019 | Pervan et al. |
| 2019/0093371 A1 | 3/2019 | Pervan |
| 2019/0119928 A1 | 4/2019 | Pervan et al. |
| 2019/0127989 A1 | 5/2019 | Kell |
| 2019/0127990 A1 | 5/2019 | Pervan et al. |
| 2019/0169859 A1 | 6/2019 | Pervan et al. |
| 2019/0232473 A1 | 8/2019 | Fransson et al. |
| 2019/0271165 A1 | 9/2019 | Boo |
| 2019/0376298 A1 | 12/2019 | Pervan et al. |
| 2019/0394314 A1 | 12/2019 | Pervan et al. |
| 2020/0087927 A1 | 3/2020 | Pervan |
| 2020/0102756 A1 | 4/2020 | Pervan |
| 2020/0109569 A1 | 4/2020 | Pervan |
| 2020/0149289 A1 | 5/2020 | Pervan |
| 2020/0263437 A1 | 8/2020 | Pervan |
| 2020/0284045 A1 | 9/2020 | Kell |
| 2020/0318667 A1 | 10/2020 | Derelöv |

FOREIGN PATENT DOCUMENTS

| | | | |
|---|---|---|---|
| DE | 202 05 774 U1 | 8/2002 | |
| DE | 203 20 799 U1 | 4/2005 | |
| DE | 10 2004 055 951 A1 | 7/2005 | |
| DE | 10 2006 057 491 A1 | 6/2008 | |
| EP | 0 974 713 A1 | 1/2000 | |
| EP | 1 420 125 A2 | 5/2004 | |
| EP | 1 650 375 A1 | 4/2006 | |
| EP | 1 674 223 A1 | 6/2006 | |
| EP | 1 650 375 A8 | 9/2006 | |
| EP | 1 674 223 B1 | 7/2008 | |
| EP | 2 395 179 A2 | 12/2011 | |
| EP | 2276614 B1 * | 9/2012 | .......... B27M 3/0066 |
| EP | 2 689 904 A1 | 1/2014 | |
| EP | 2 732 923 A2 | 5/2014 | |
| EP | 2 774 735 A1 | 9/2014 | |
| EP | 2 723 923 B1 | 1/2018 | |
| GB | 240629 | 10/1925 | |
| GB | 1171337 | 11/1969 | |
| GR | 376352 | 7/1932 | |
| SE | 529 076 C2 | 4/2007 | |
| WO | WO 94/26999 A1 | 11/1994 | |
| WO | WO 96/27721 A1 | 9/1996 | |
| WO | WO 97/47834 A1 | 12/1997 | |
| WO | WO 00/20705 A1 | 4/2000 | |
| WO | WO 00/43281 A2 | 7/2000 | |
| WO | WO 00/47841 A1 | 8/2000 | |
| WO | WO 00/55067 A1 | 9/2000 | |
| WO | WO 01/02669 A1 | 1/2001 | |
| WO | WO 01/02670 A1 | 1/2001 | |
| WO | WO 01/02671 A1 | 1/2001 | |
| WO | WO 01/51732 A1 | 7/2001 | |
| WO | WO 01/75247 A1 | 10/2001 | |
| WO | WO 01/98604 A1 | 12/2001 | |
| WO | WO 03/016654 A1 | 2/2003 | |
| WO | WO 03/044303 A1 | 5/2003 | |
| WO | WO 03/083234 A1 | 10/2003 | |
| WO | WO 03/087497 A1 | 10/2003 | |
| WO | WO 2004/016877 A1 | 2/2004 | |
| WO | WO 2004/020764 A1 | 3/2004 | |
| WO | WO 2004/085765 A1 | 10/2004 | |
| WO | WO 2005/054599 A1 | 6/2005 | |
| WO | WO 2006/043893 A1 | 4/2006 | |
| WO | WO 2006/104436 A1 | 10/2006 | |
| WO | WO 2007/015669 A2 | 2/2007 | |
| WO | WO 2007/015669 A3 | 2/2007 | |
| WO | WO 2007/079845 A1 | 7/2007 | |
| WO | WO 2007/109787 A2 | 9/2007 | |
| WO | WO 2008/068245 A1 | 6/2008 | |
| WO | WO 2009/116926 A1 | 9/2009 | |
| WO | WO 2009/124517 A1 | 10/2009 | |
| WO | WO 2010/001262 A2 | 1/2010 | |
| WO | WO 2010/087752 A1 | 8/2010 | |
| WO | WO 2012/154113 A1 | 11/2012 | |
| WO | WO 2013/025105 A1 | 2/2013 | |
| WO | WO 2013/025164 A1 | 2/2013 | |
| WO | WO 2013/025165 A1 | 2/2013 | |
| WO | WO 2013/037904 A1 | 3/2013 | |
| WO | WO 2015/038059 A1 | 3/2015 | |
| WO | WO 2017/135874 A1 | 8/2017 | |

OTHER PUBLICATIONS

International Search Report and Written Opinion issued in PCT/SE2017/050718, dated Sep. 15, 2017, 11 pages, ISA/SE, Patent-och registreringsverket, Stockholm, SE.

International Search Report and Written Opinion issued in PCT/SE2017/050716, dated Sep. 15, 2017, 10 pages, ISA/SE, Patent-och registreringsverket, Stockholm, SE.

International Search Report and Written Opinion issued in PCT/SE2017/050717, dated Sep. 19, 2017, 13 pages, ISA/SE, Patent-och registreringsverket, Stockholm, SE.

International Search Report and Written Opinion issued in PCT/SE2017/051305, dated Mar. 5, 2018, 12 pages, ISA/SE, Patent-och registreringsverket, Stockholm, SE.

(56) References Cited

OTHER PUBLICATIONS

International Search Report and Written Opinion issued in PCT/SE2017/050711, dated Sep. 19, 2017, 12 pages, SA/SE, Patent-och registreringsverket, Stockholm, SE.
Extended European Search Report dated Jan. 2, 2020 in EP 17820655.3, European Patent Office, Munich, DE, 14 pages.
Extended European Search Report dated Dec. 9, 2019 in EP 17820656.1, European Patent Office, Munich, DE, 10 pages.
Extended European Search Report dated Jan. 30, 2020 in EP 17820652.0, European Patent Office, Munich, DE, 10 pages.
U.S. Appl. No. 16/839,657, filed Apr. 3, 2020, Derelöv.
\*\*Derelöv, Peter, U.S. Appl. No. 16/839,657, entitled "Automated Assembly," filed in the U.S. Patent and Trademark Office on Apr. 3, 2020.
\*\*Fransson, Jonas, U.S. Appl. No. 17/060,325, entitled "Method and Device for Inserting a Tongue," filed in the U.S. Patent and Trademark Office on Oct. 1, 2020.

\* cited by examiner

METHOD AND DEVICE FOR INSERTING A TONGUE

CROSS REFERENCE TO RELATED APPLICATIONS

The present application claims the benefit of Swedish Application No. 1650938-2, filed on Jun. 29, 2016. The entire contents of Swedish Application No. 1650938-2 are hereby incorporated herein by reference in their entirety.

FIELD OF THE INVENTION

Embodiments of the present invention relate to methods and devices for inserting a tongue into an insertion groove in a panel. The panel is configured to be arranged and locked perpendicular to an adjacent panel by a locking device comprising the tongue. The panels may be assembled and locked together to obtain a furniture product, such as a bookshelf, a cupboard, a wardrobe, a box, a drawer or a furniture component.

BACKGROUND OF THE INVENTION

A conventional furniture product may be assembled by a plurality of elements or panels. The panels may be assembled with a mechanical locking device, such as disclosed in, for example, WO 2012/154113 A1. The product comprises a first panel connected perpendicularly to a second panel by a mechanical locking device comprising, an edge tongue at the first panel, an edge groove at the second panel and a flexible tongue in an insertion groove.

WO 2015/038059 discloses a product assembled by a plurality of panels that are locked by mechanical locking devices comprising a flexible tongue in an insertion groove.

The locking devices of the panels are generally produced in a production line by a continuous production process, comprising a number of milling tools. The edge groove and the insertion groove may extend contiguously from a front edge to a back edge of the panel. The edge groove is preferably covered at the front edge by a decorative layer. The edge groove and the insertion groove may also end before the front edge and/or the back edge as disclosed in, e.g., SE 1650135-5.

Embodiments of the present invention address a need to provide an improved method and an improved device for separating a tongue from a tongue blank before inserting the tongue into an insertion groove in a panel.

SUMMARY OF THE INVENTION

Accordingly, embodiments of the present invention preferably seek to mitigate, alleviate or eliminate one or more deficiencies, disadvantages or issues in the art, such as the above-identified, singly or in any combination by providing a method for inserting a tongue in an insertion groove in a panel.

A further object of embodiments of the invention is to provide a device for inserting a tongue in an insertion groove in a panel.

Embodiments of the invention may have the advantages that the tongue is guided in a reliable manner close to a correct position and that weights of parts of the device that are displaced are low such that a displacement speed of the parts may be increased and the time for inserting a tongue is reduced.

At least some of these and other objects and advantages that will be apparent from the description have been achieved by a first aspect of the invention comprising a method for inserting a tongue in an insertion groove in a panel by a device, wherein the method comprises:

displacing a tongue guiding device in a first direction by displacing a puncher in the first direction, and displacing a tongue between a first part and a second part of the tongue guiding device and into an insertion groove in panel by further displacing the puncher.

The embodiments may be advantageous for inserting the tongue into an embodiment of the insertion groove in a panel while displacing the panel in a panel feeding direction. The embodiments may be particularly advantageous for inserting the tongue into an insertion groove comprising a side wall in the feeding direction and/or into an insertion groove in an edge groove comprising a side wall in the feeding direction. The side wall may be end of the edge groove or the insertion groove at a distance from an adjacent edge of the panel. The tongue guiding device may be displaced close to an opening of the insertion groove such that the tongue may be guided in a reliable manner close to a correct position. The tongue guiding device may, after the displacing of the tongue into the insertion groove, be displaced towards an initial position, before colliding with any side wall or other obstacle of the panel which preferably is continuously displaced in the feeing direction.

The method may comprise displacing the puncher in the first direction a longer distance than said displacing of the tongue guiding device.

The method may comprise displacing the first part of the tongue guiding device a longer distance in the first direction than the second part of the guiding device.

The method may comprise displacing the puncher and the tongue guiding device in a second direction, which is opposite the first direction, towards initial positions of the puncher and the tongue guiding device, respectively.

The method may comprise displacing a tongue queue stopper by the tongue guiding device, preferably by a protruding part, and feeding a new tongue. The new tongue is preferably identical or essentially identical to the tongue.

The method may comprise displacing the new tongue into the tongue guiding device when a first part of the tongue guiding device has reached, or is about to reach, its initial position.

The method may comprise displacing the puncher and the tongue guiding device in relation to a tongue queue device.

The method may comprise displacing the puncher in the first direction and preferably in a second direction, which is opposite to the first direction, by a motor, such as an electric motor or a pneumatic motor.

A second aspect of the invention comprises a device for inserting a tongue in an insertion groove in a panel. The device comprises a tongue guiding device, which is displaceable in a first direction, and a puncher which is configured to displace a tongue between a first part and a second part, into an inserting groove in a panel, wherein the tongue guiding device is configured to be displaced by the puncher, which is displaceable in the first direction.

The puncher may be displaceable a longer distance in the first direction than the tongue guiding device.

The first part of the tongue guiding device may be displaceable a longer distance in the first direction than the second part of the guiding device.

The puncher and the tongue guiding device may be displaceable in a second direction, which is opposite the first direction, towards initial positions of the puncher and the tongue guiding device, respectively.

The device may comprise a displaceable tongue queue stopper for controlling a feeding of a new tongue, the tongue queue stopper is preferably configured to cooperate with a protruding part on the tongue guiding device. The new tongue and tongues in the tongue queue are preferably identical or essentially identical to the tongue.

The device may be configured such that a new tongue is displaced into the tongue guiding device when the first part of the tongue guiding device has reached, or is about to reach, its initial position.

The puncher and the tongue guiding device may be displaceable in relation to a tongue queue device.

The device preferably comprises a spring element between a power unit, such as a motor, and the puncher. The spring element may have the advantage that the device and/or the panel is/are not damaged in case any one of the panel, the insertion groove and the puncher is/are positioned in a wrong position(s).

The device may comprise a motor, such as an electric motor or a pneumatic motor, configured to drive the puncher in the first direction and preferably in a second direction, which is opposite to the first direction.

The puncher, the first part and the second part are preferably coupled together by spring element such that desired positions of the puncher, the first part and the second part are obtained.

An advantage of embodiments of the device may be that only one motor is required to drive at least the puncher and the guiding device and preferably also the queue stopper.

The weight of the device may be decreased by having only one motor.

The tongue according to the first and/or second aspect may comprise one or more of the features below:

The tongue may be of an elongated shape and may comprise a first long edge and a second long edge. The first edge may be a first short edge, and the second edge may be an opposite second short edge.

A longitudinal direction of the tongue is preferably perpendicular to the first direction.

The tongue may be a flexible tongue and made of, e.g., a polymer and preferably comprising a reinforcement material, such as a fibre, e.g., fiberglass.

The tongue may comprise a bendable part at the first long edge and preferably a groove adjacent the bendable part. The bendable part may be configured to be pushed into the groove adjacent the bendable part. The tongue may comprise several of said bendable part and preferably several of said groove.

The tongue may comprise a polymer material and is preferably produced by injection moulding.

The tongue may be connected to several tongues in the tongue blank by a first rail at the first short edge and preferably by a second rail at the second short edge. A separating device preferably separates the tongue from the first rail and preferably from any second rail before the tongue is displaced to the tongue queue of a tongue queue device.

The first rail and the second rail may extend in a length direction perpendicular to the tongue.

The tongue may be connected to the first rail and/or the second rail, which may be casting gates, by a first and a second casting gate, respectively The tongue is preferably configured to be displaceable in the insertion groove.

The device is preferably a part of a production line comprising milling tools for forming a locking device at the edge of the panel. The locking device preferably comprises said insertion groove.

The edge groove and the insertion groove may extend contiguously from a front edge to a back edge of the panel.

BRIEF DESCRIPTION OF THE DRAWINGS

These and other aspects, features and advantages of which embodiments of the invention are capable of, will be apparent and elucidated from the following description of embodiments of the present invention, reference being made to the accompanying drawings, in which.

DESCRIPTION OF EMBODIMENTS

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

Embodiments of the method for inserting a tongue into an insertion groove and a device for the method are shown that may have an improved efficiency. The embodiments may be advantageous for inserting the tongue into an insertion groove at an edge of a panel while displacing the panel in a panel feeding direction. The embodiments may be particularly advantageous for inserting the tongue into an insertion groove comprising a side wall in the feeding direction and/or into an insertion groove in an edge groove comprising a side wall in the feeding direction.

An embodiment of the method is shown in FIGS. 1A-1H. The method comprises inserting a tongue 30 in an insertion groove 20 in a panel by a device, wherein the method comprises:

displacing a tongue guiding device in a first direction 91 by displacing a puncher 81 in the first direction 91, and displacing a tongue 30 between a first part 83 and a second part 82 of the tongue guiding device and into an insertion groove 20 in panel by further displacing the puncher 81.

Figure 1A:
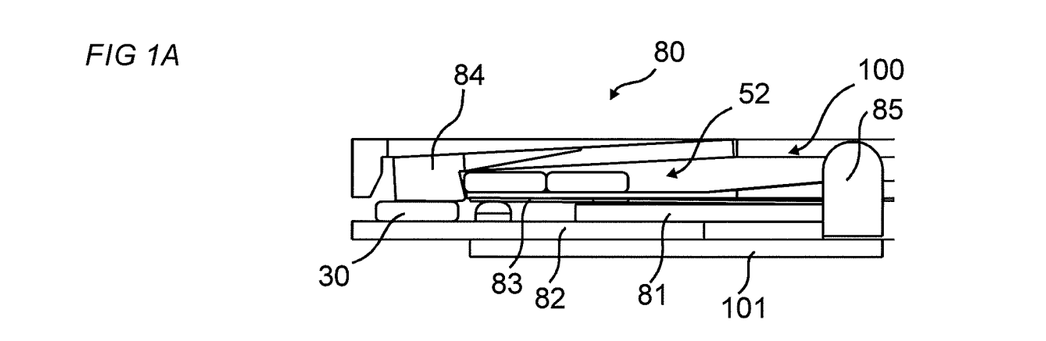
FIGS. 1A-1H show a method for inserting a tongue into an insertion groove of a panel according to an embodiment of the invention.
Figure 1B:
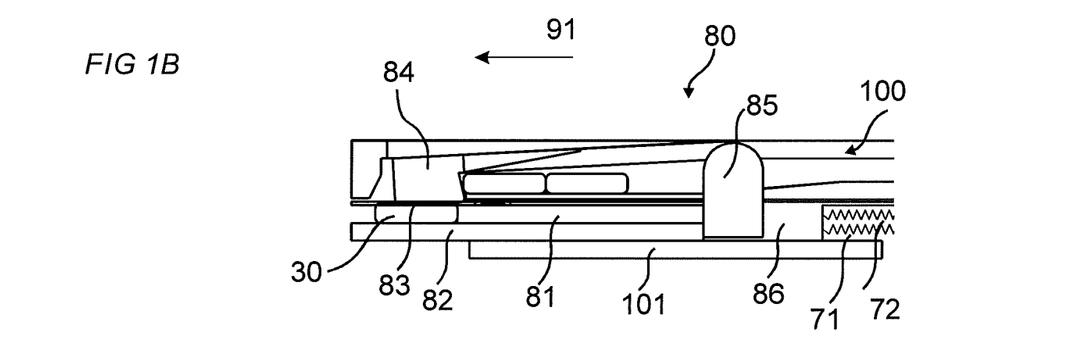
Figure 1C:
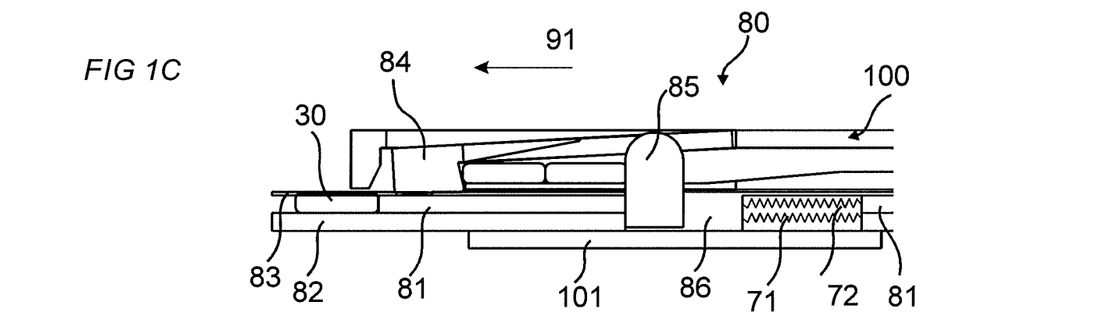

The method may comprise displacing the puncher 81 in the first direction 91 a longer distance than said displacing of the tongue guiding device. FIG. 1A shows an initial position of the puncher 81 and the guiding device. The guiding device is displaced in the first position until it has reached an outer end position shown in FIG. 1D, the puncher continues to be displaced until it has reached an outer end position shown in FIG. 1E.

Figure 1D:
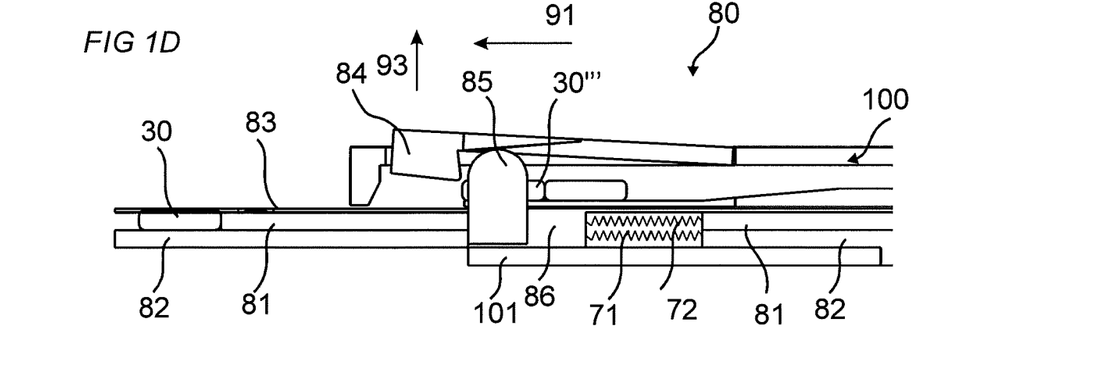
Figure 1E:
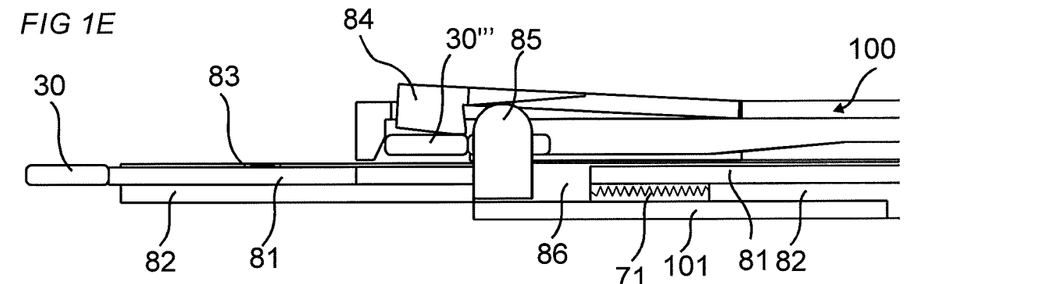
Figure 1F:
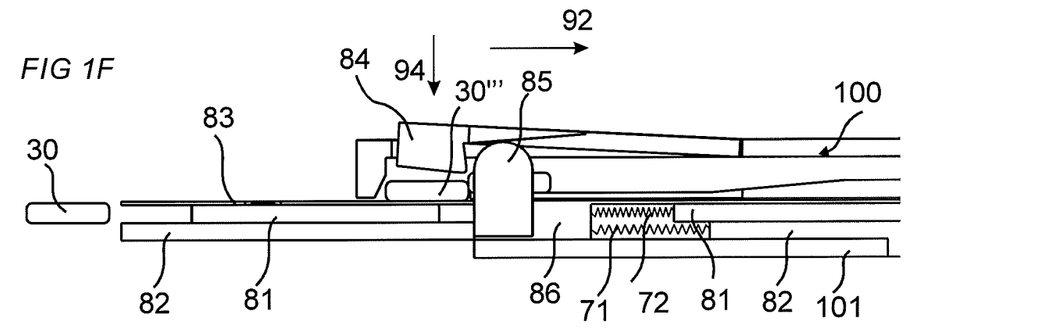
Figure 1G:
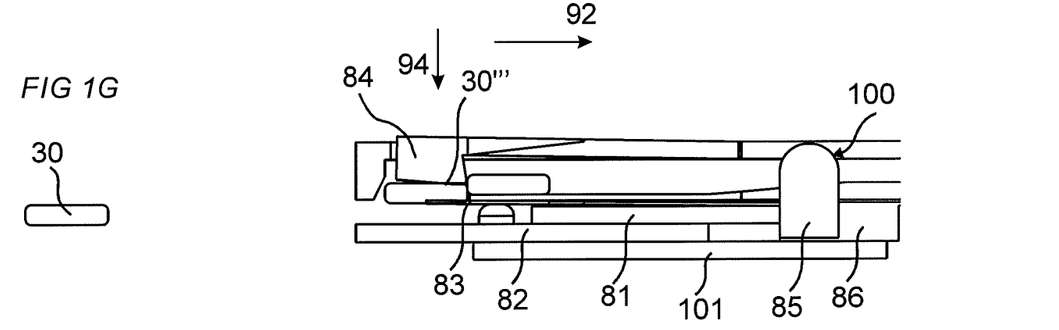
Figure 1H:
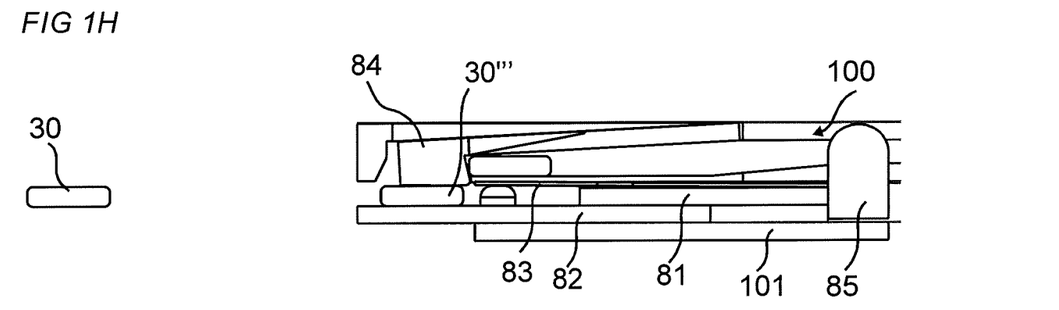

The method may comprise displacing the first part 83 of the tongue guiding device a longer distance in the first direction 91 than the second part 82 of the guiding device. The first part and the second part may have the same outer end position, which is shown in FIG. 1D. The first part may have an initial position which is at a distance from an initial position of the second part, see FIG. 1A. The distance may be essentially the same or longer than a width of the tongue 30.

The method may comprise displacing the puncher 81 and the tongue guiding device in a second direction 92, which is opposite the first direction 91, towards initial positions of the puncher 81 and the tongue guiding device, respectively. A beginning of a displacement of the puncher 81 in the second direction is shown FIG. 1F. A beginning of a displacement of the guiding device in the second direction is shown FIG. 1G, i.e., after the beginning of a displacement of the puncher 81.

The method may comprise displacing 93 a tongue queue stopper 84 by the tongue guiding device, preferably by a protruding part 85, and feeding a new tongue 30''', as is shown in FIG. 1D. The method may comprise displacing the tongue queue stopper in an opposite direction 94 when the tongue guiding device is being displaced in the second direction, see FIG. 1G.

The method may comprise displacing the new tongue 30''' into the tongue guiding device when a first part 83 of the tongue guiding device has reached, or is about to reach, its initial position, as is shown in FIG. 1 H.

The method may comprise displacing the puncher 81 and the tongue guiding device in relation to a tongue queue device 100.

The method may comprise displacing the puncher 81 in the first direction 91 and preferably in a second direction 92, which is opposite to the first direction, by a motor (not shown), such as an electric motor or a pneumatic motor.

Figure 2:
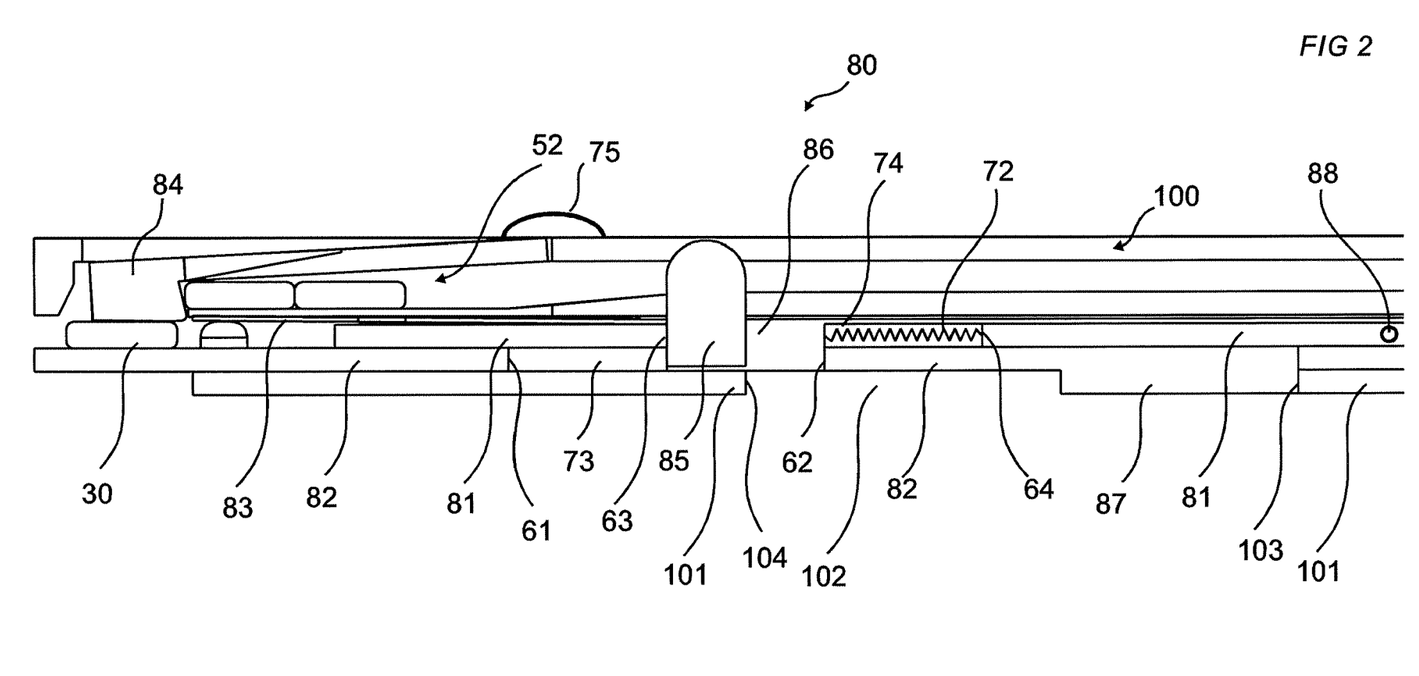
FIG. 2 shows a schematic drawing of an enlargement of a device in a cross-section, according to an embodiment of the invention, in a position corresponding to FIG. 1A FIGS. 3A-3B show a schematic drawing of an enlargement of a device in a cross-section, according to an embodiment of the invention, in a position corresponding to FIG. 1E FIGS. 4A-4D show embodiments of the tongue according to embodiments of the invention.
Figure 3A:
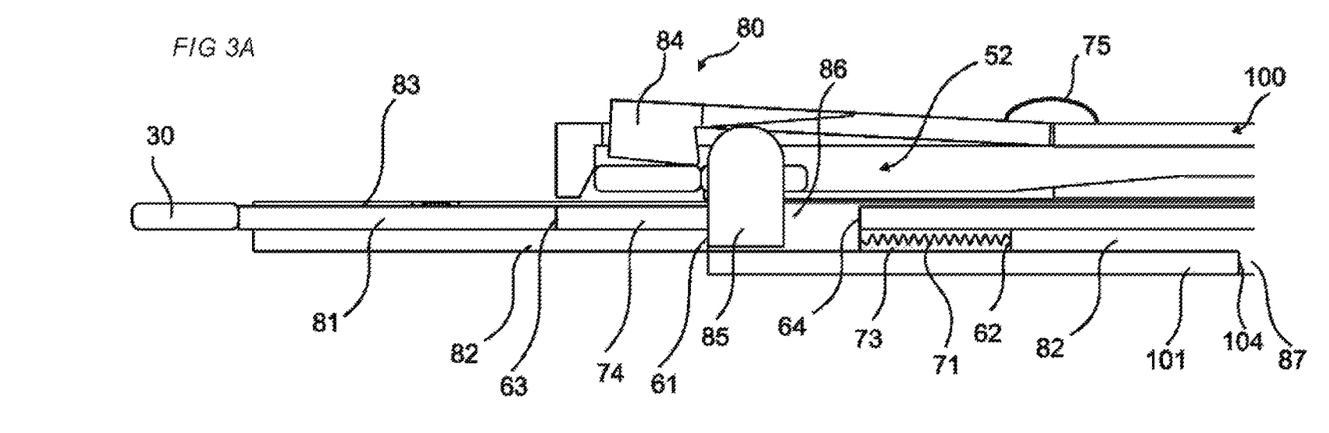
Figure 3B:
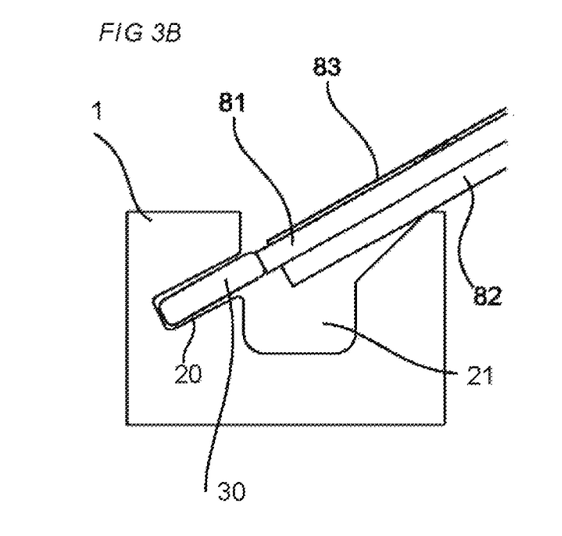

An embodiment of the device 80 in the initial position is shown in FIG. 2 and an outer end position is shown in FIG. 3A and FIG. 3B. FIG. 3B shows an embodiment of the panel 1 comprising an insertion groove 20 in an edge groove 21, the tongue 30, the puncher 81 and the first part 83 and the second part 82 of the tongue guiding device. The tongue guiding device is displaced to a position close to an opening of the insertion groove. The distance between the guiding device and the opening is preferably about 1 mm or may be in the range of about 0.5 mm to about 2 mm. The device comprises a tongue guiding device, which is displaceable in a first direction 91, and a puncher 81 which is configured to displace a tongue 30 between a first part 83 and a second part 82, into an inserting groove 20 in a panel, wherein the tongue guiding device is configured to be displaced by the puncher, which is displaceable in the first direction 91.

FIGS. 2 and 3A shows an attachment device 88 for coupling the puncher 81 to the motor by a coupling element. The coupling element may comprise a spring element.

The puncher, the first part and the second part are preferably coupled together by spring elements (71,72) such that desired positions of the puncher, the first part and the second part are obtained.

The puncher 81 may be coupled to a coupling device 86 by a second spring 72.

The first part 83 of the tongue guiding device may be attached to the coupling device 86.

The first part 83 of the tongue guiding device may not be displaceable relative the coupling device 86.

The second part 82 of the tongue guiding device may be attached to the coupling device 86. The second part 82 of the tongue guiding device may be coupled to the coupling device by a first spring 71.

An embodiment of the device 80 may comprise a fixed structural element 101 comprising a first guiding groove 102. A protruding part 87 of the second part 82 of the guiding device may be configured to be displaceable between a first surface 103 of the first guiding groove 102 and an opposite second surface 104 of the first guiding groove.

The puncher 81 may be configured to drive the protruding part, via the second spring 72, the coupling device 86 and the first spring 71, between the first surface 103 and the second surface 104 of the first guiding groove 102. The first surface 103 and the second surface 104 may determine the displacement range, in the first direction 91 and the second direction 92, respectively, of the second part 82 of the guiding device.

The second part 82 of the tongue guiding device may comprise a second guiding groove 73 comprising a first surface 61 and an opposite second surface 62. The coupling device 86 may be displaceable relative the second part 82 of the tongue guiding device. The first surface 61 and the opposite second surface 62 may determine the displacement range, in the first direction 91 and the second direction 92, respectively, of the coupling device 86 relative the second part 82 of the tongue guiding device.

The puncher 81 may comprise a third guiding groove 74 comprising a first surface 63 and an opposite second surface 64. The puncher 81 may be displaceable relative the coupling device 86.

The first surface 63 and the opposite second surface 64 of the third guiding groove 74 may determine the displacement range, in the first direction 91 and the second direction 92, respectively, of the puncher 81 relative the coupling device 86.

The coupling device 86 is in the initial position shown in FIG. 2 in contact with the second surface 62 of the second guiding groove 73 and the first spring 71 is compressed.

The protruding part of the second part 82 of the guiding device is in the initial position shown in FIG. 2 in contact with the first surface 103 of the first guiding groove 102.

The coupling device 86 is in the outer end position shown in FIG. 3A in contact the second surface 64 of the third guiding groove 74 the second spring 71 is compressed.

The protruding part 87 of the second part 82 of the guiding device is in the outer end position shown in FIG. 3A in contact with the second surface 104 of the first guiding groove 102.

The puncher 81 may be displaceable a longer distance in the first direction than the tongue guiding device.

The first part 83 of the tongue guiding device may be displaceable a longer distance in the first direction than the second part 82 of the guiding device.

The puncher 81 and the tongue guiding device may be displaceable in a second direction 92, which is opposite the first direction 91, towards initial positions of the puncher 81 and the tongue guiding device, respectively.

The device may comprise a displaceable tongue queue stopper 84 for controlling a feeding of a new tongue, the tongue queue stopper 84 is preferably configured to cooperate with a protruding part 85 on the tongue guiding device.

The protruding part 85 which is configured to displace the tongue queue stopper 84 may be attached to the coupling device 86. The protruding part 85 may not be displaceable relative the coupling device 86.

The device may be configured such that a new tongue 30''' is displaced into the tongue guiding device when the first part 83 of the tongue guiding device has reached, or is about to reach, its initial position. The new tongue and tongues in the tongue queue are preferably identical or essentially identical to the tongue.

The puncher 81 and the tongue guiding device may be displaceable in relation to a tongue queue device 100.

The device preferably comprises a spring element between a power unit, such as a motor (not shown), and the puncher 81. The spring element may have the advantage that the device and/or the panel are not damaged in case any one of the panel, the insertion groove and the puncher is/are positioned in a wrong position(s).

The device may comprise a motor (not shown), such as an electric motor or a pneumatic motor, configured to drive the puncher 81 in the first direction 91 and preferably in a second direction 92, which is opposite to the first direction.

The tongue queue stopper 84 is preferably coupled to the device by a spring element 75. The tongue queue stopper may be displaced in a one direction by cooperation with the tongue guiding device and displaced in a return direction by the spring element.

An advantage of this embodiment of the device may be that only one motor is required to drive the puncher, the guiding device and the tongue queue stopper.

Figure 4A:
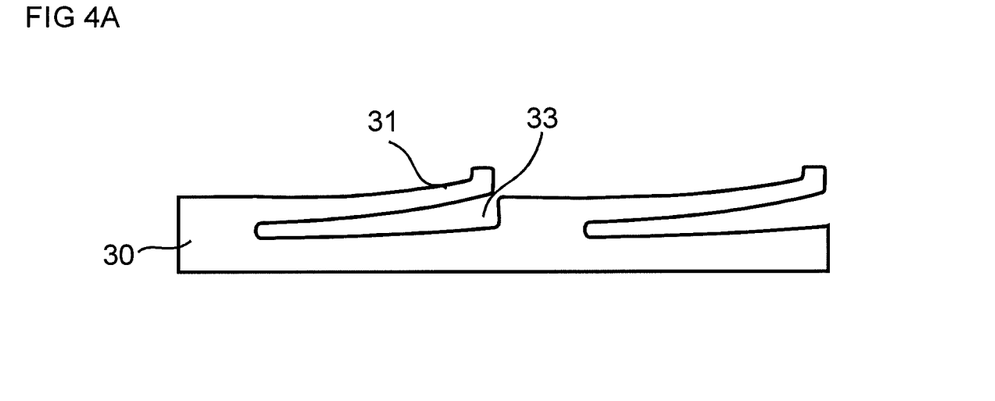
Figure 4B:
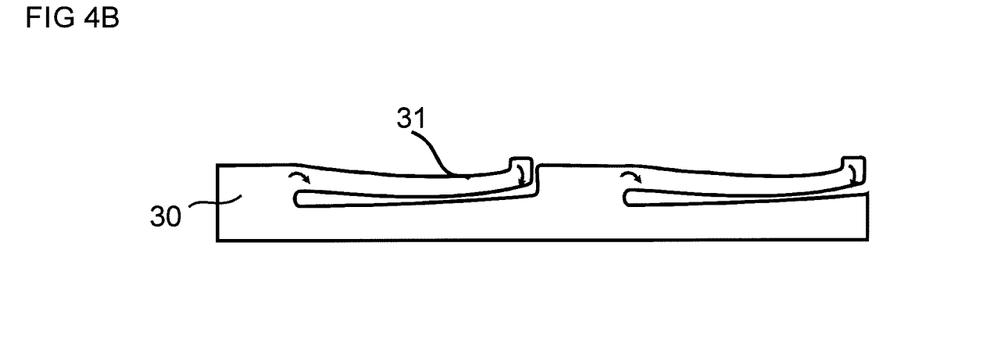
Figure 4C:
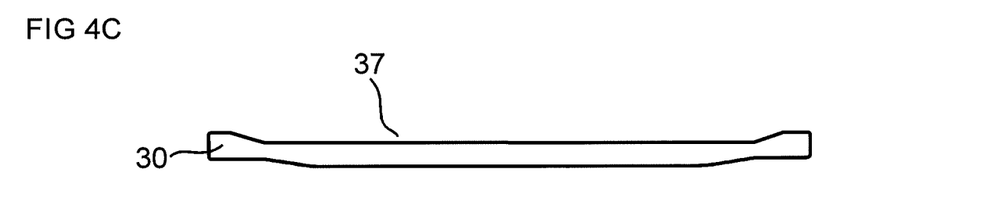
Figure 4D:
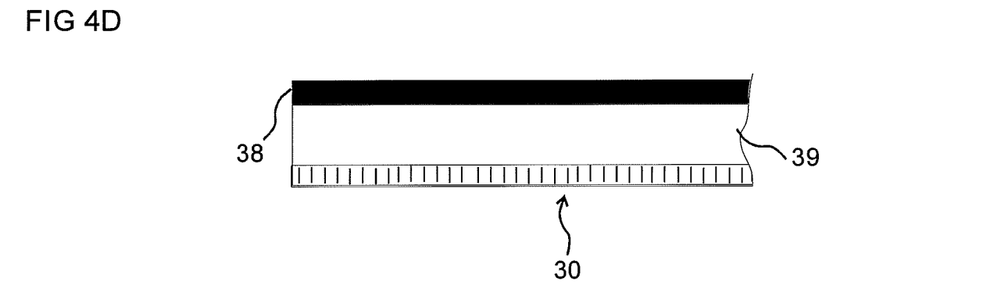

Embodiments of the tongue 30, which may be displaceable in an insertion groove 20, see FIGS. 6A-6D, are shown in FIGS. 4A-4D. A first embodiment of the tongue, which is shown in FIG. 3A-3B, comprises bendable protruding parts 31 at a first long edge of the tongue. The first embodiment is shown in a relaxed state in FIG. 4A and in a compressed state in FIG. 4B. A second long edge of the tongue is preferably essentially straight. The first embodiment may be inserted into the insertion groove with the bendable protruding parts facing towards a bottom of the insertion groove and the second edge extending beyond an opening of the insertion groove. A second embodiment of the tongue, which is shown in FIG. 4C in a relaxed state, is of an elongated shape and flexible. The second embodiment comprises a recess 37 at a first long edge of the tongue and a second edge which is essentially straight. The recess is decreased in a compressed state of the second embodiment. The second embodiment may be inserted into the insertion groove with the recess 37 facing towards a bottom of the insertion groove and the second edge extending beyond an opening of the insertion groove. A third embodiment of the tongue, which is shown in FIG. 4D, comprises a first part 38, which is flexible and configured to be compressed, and a second part 39 which is rigid. The first part may be arranged in the insertion groove and the second part may partly extend beyond an opening of the insertion groove.

The tongue may be configured as any of the embodiments of the displaceable tongue disclosed in, e.g., WO 2006/043893 and WO 2007/015669, the entire contents of which are hereby expressly incorporated herein by reference.

The tongue may be flexible and made of, e.g., a polymer and preferably comprising a reinforcement material, such as a fibre, e.g., fiberglass.

Figure 5A:
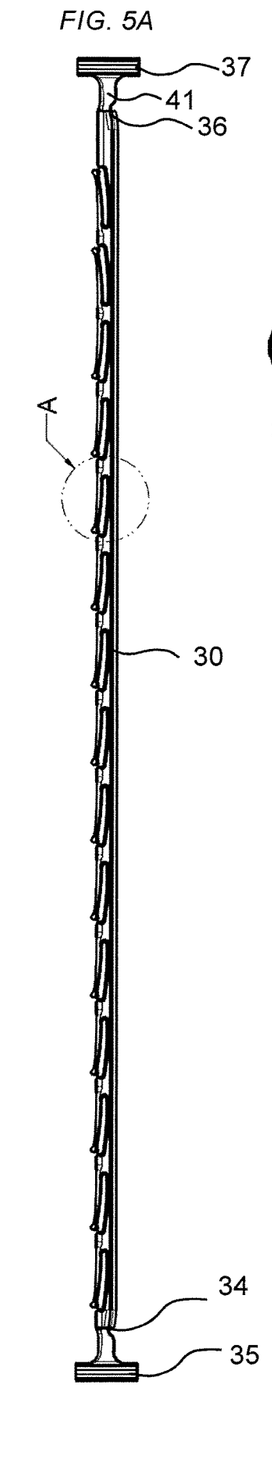
FIGS. 5A-5D show an embodiment of the tongue according to an embodiment of the invention.
Figure 5B:
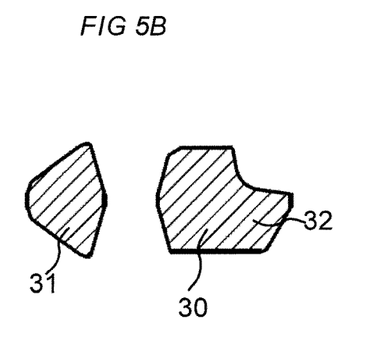
Figure 5C:
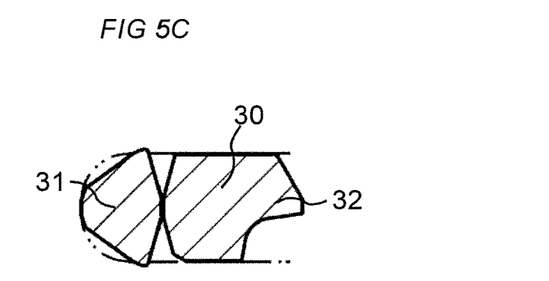
Figure 5D:
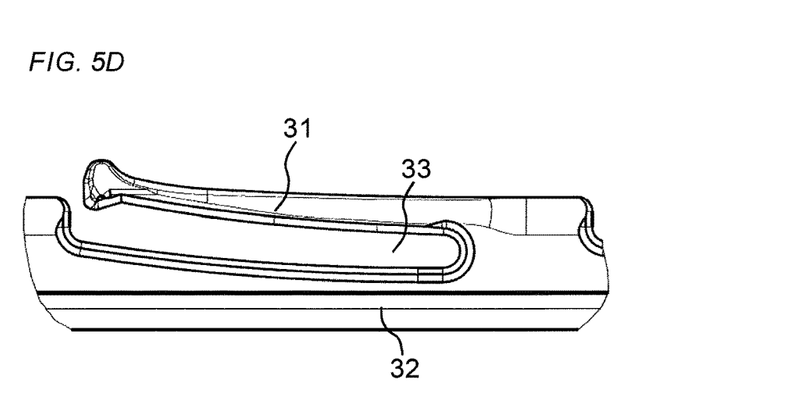

Another embodiment of the tongue 30 is shown in FIGS. 5A-5D. The tongue is of an elongated shape and comprises a first short edge 34, an opposite second short edge 36, first long edge and a second long edge 32. FIG. 5D shows an enlargement of the encircled area A indicated in FIG. 5A. The tongue comprises several bendable parts 31 at the first long edge and a groove 33 at each bendable part 31. The tongue comprises a polymer material and is preferably produced by injection moulding. The bendable part 31 is configured to be pushed into the groove 33 in a compressed state of the tongue.

FIG. 5A shows an embodiment of tongue which is connected to several tongues (not shown) in a tongue blank by a first rail 35 at the first short edge 34 and by a second rail 37 at the second short edge 36. The first rail and the second rail extend in a length direction perpendicular to the tongue. The tongue may be connected to the first rail and/or the second rail, which may be casting gates, by a first and a second casting gate 41,42, respectively.

FIG. 5B and FIG. 5C show the tongue 30 in a cross cut view. The tongue is in FIG. 5B in a relaxed state an in FIG. 5C in a compressed state. A distance between an outer part of the bendable part 31 and the second long edge 32 is shorter in the compressed state compared to in the relaxed state.

The tongue is preferably configured to be inserted into an insertion groove of a panel for locking the panel to an adjacent panel.

FIGS. 6A-6D shows embodiments of the panel 1, each comprising an embodiment of the tongue 30 inserted in an embodiment of the insertion groove 20, connected to an adjacent panel 2. The embodiments of the panel shown in FIGS. 6A-6D may be furniture panels. The embodiment of the panel shown in FIG. 6C may also be a floor panel.

Figure 6A:
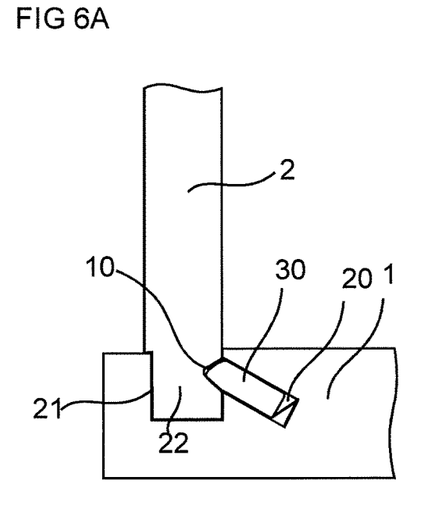
FIGS. 6A-6D show embodiments of the panel according to embodiments of the invention.

FIG. 6A shows the panel 1 arranged perpendicular to an adjacent panel 2 and locked to the adjacent panel in a first direction and in a second direction, which is perpendicular to the first direction. The panel comprising an edge groove 21 at an upper surface of the panel. The edge groove 21 is of a longitudinal shape and extends along an edge of the panel 1. The edge groove comprising said insertion groove 20, which is extending along the edge groove, comprising said tongue 30. The adjacent panel comprises an edge tongue 22 which comprises a tongue groove 10 extending along an edge of the adjacent panel. The tongue 30 is configured to cooperate with the tongue groove 10 for locking together the panel 1 with the adjacent panel 2 in the first direction. The edge tongue 22 is configured to cooperate with the edge groove 21 for locking together the panel 1 with the adjacent panel 2 in the second direction.

Figure 6B:
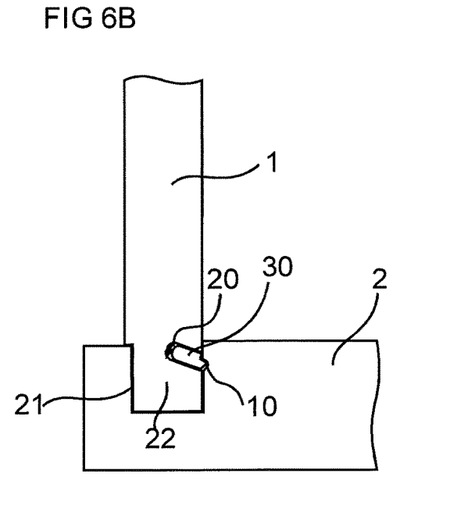

FIG. 6B shows the panel 1 arranged perpendicular to an adjacent panel 2 and locked to the adjacent panel in a first direction and in a second direction, which is perpendicular to the first direction. The adjacent panel comprising an edge groove 21 at an upper surface of the adjacent panel. The edge groove 21 is of a longitudinal shape and extends along an edge of the adjacent panel 1. The edge groove comprises a tongue groove 10. The panel comprises an edge tongue 22 which comprises said insertion groove 20 comprising said tongue 30. The insertion groove is extending along the edge tongue. The tongue 30 is configured to cooperate with the tongue groove 10 for locking together the panel 1 with the adjacent panel 2 in the first direction. The edge tongue 22 is configured to cooperate with the edge groove 21 for locking together the panel 1 with the adjacent panel 2 in the second direction.

Figure 6C:
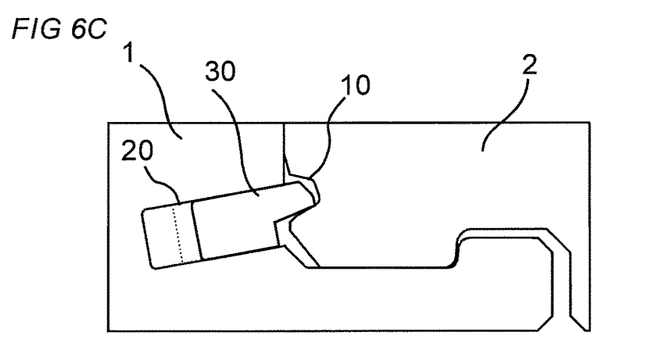

FIG. 6C shows the panel 1 arranged parallel to an adjacent panel 2 and locked to the adjacent panel in a first direction and in a second direction, which is perpendicular to the first direction. The panel comprising said insertion groove 20 which is extending along an edge of the panel. The edge comprises a strip protruding from the edge and the strip comprises an upwardly protruding locking element. The adjacent panel 2 comprises a tongue groove 10 extending along an adjacent edge of the adjacent panel 2. The adjacent edge comprises a locking groove with an opening facing downwards. The tongue 30 is configured to cooperate with the tongue groove 10 for locking the panel to the adjacent panel in a first direction and the locking element is configured to cooperate with the locking groove for locking the panel to the adjacent panel in the second direction. An embodiment of the said first and second panel comprises the insertion groove 20 at the adjacent edge of the adjacent panel and the tongue groove 10 at the edge of the panel.

Figure 6D:
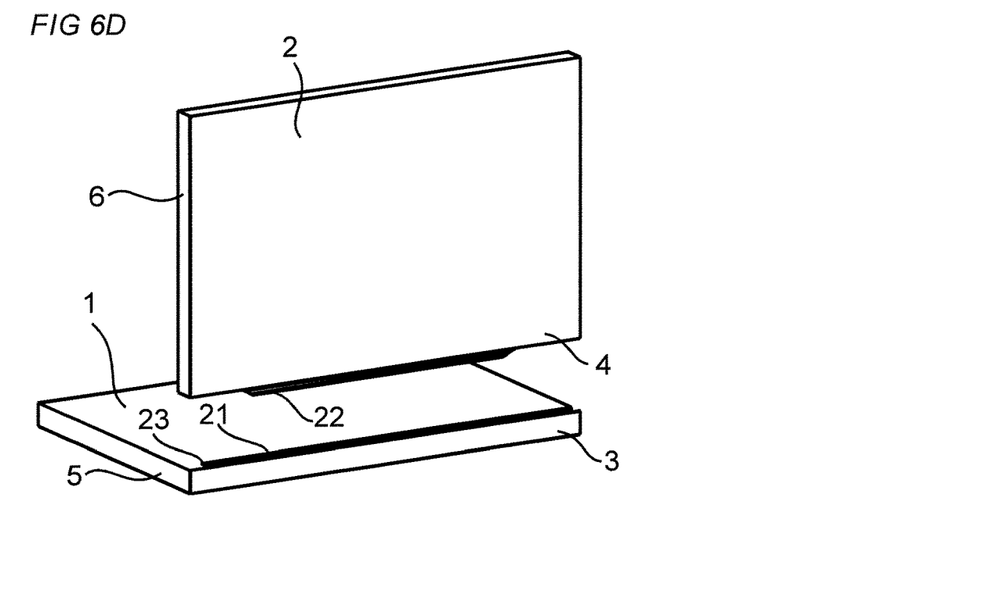

FIG. 6D shows an embodiment of the panel and the adjacent panel shown in FIG. 6A in a 3D-view. The edge tongue 22 is extending along the edge 4 of the adjacent panel and ends before an adjacent edge 6 of the adjacent panel 2. The edge groove 21 is extending along the edge 3 of the panel 1 and ends at a side wall 23 before an adjacent edge of the 5 of the panel 1.

A core material of embodiments of the panel and the adjacent panel described above may comprises a wood fibre based board, such as a HDF, MDF, plywood, solid wood or particleboard, or a reinforced plastic board or a wood fibre composite board. The core may be provided with a decorative layer.

EMBODIMENTS

1. A method for inserting a tongue in an insertion groove in a panel by a device, wherein the method comprises:
displacing a tongue guiding device in a first direction (91) by displacing a puncher (81) in the first direction (91), and
displacing a tongue (30) between a first part (83) and a second part (82) of the tongue guiding device and into an insertion groove (20) in panel by further displacing the puncher (81).

2. The method as in embodiment 1, comprising displacing the puncher (81) in the first direction (91) a longer distance than said displacing of the tongue guiding device.

3. The method as in embodiment 1 or 2, comprising displacing the first part (83) of the tongue guiding device a longer distance in the first direction (91) than the second part (82) of the guiding device.

4. The method as in any of the embodiments 1-3, comprising displacing the puncher (81) and the tongue guiding device in a second direction (92), which is opposite the first direction (91), towards initial positions of the puncher (81) and the tongue guiding device, respectively.

5. The method as in embodiment 4, comprising displacing (93) a tongue queue stopper (84) by the tongue guiding device, preferably by a protruding part (85), and feeding a new tongue (30''').

6. The method as in embodiment 5, comprising displacing the new tongue (30''') into the tongue guiding device when a first part (83) of the tongue guiding device has reached, or is about to reach, its initial position.

7. The method as in any one of embodiments 1-6, comprising displacing the puncher (81) and the tongue guiding device in relation to a tongue queue device (100).

8. The method as in any one of the embodiments 1-7, comprising displacing the puncher (81) in the first direction (91), and preferably in a second direction (92), which is opposite to the first direction, by a motor, such as an electric motor or a pneumatic motor.

9. A device for inserting a tongue in an inserting groove in a panel, wherein the device comprises a tongue guiding device, which is displaceable in a first direction (91), and a puncher (81), which is configured to displace a tongue (30) between a first part (83) and a second part (82), into an inserting groove (20) in a panel, wherein the tongue guiding device is configured to be displaced by the puncher, which is displaceable in the first direction (91).

10. The device as in embodiment 9, wherein the puncher (81) is displaceable a longer distance in the first direction than the tongue guiding device.

11. The device as in embodiment 9 or 10, wherein the first part (83) of the tongue guiding device is displaceable a longer distance in the first direction than the second part (82) of the guiding device.

12. The device as in any of the embodiments 9-11, wherein the puncher (81) and the tongue guiding device are displaceable in a second direction (92), which is opposite the first direction (91), towards initial positions of the puncher (81) and the tongue guiding device, respectively.

13. The device as in embodiment 12, wherein the device comprises a displaceable tongue queue stopper (84) for controlling a feeding of a new tongue, the tongue queue stopper (84) is preferably configured to cooperate with a protruding part (85) on the tongue guiding device.

14. The device as in any one of the embodiments 9-13, wherein the device is configured such that a new tongue (30''') is displaced into the tongue guiding device when the first part (83) of the tongue guiding device has reached, or is about to reach, its initial position.

15. The device as in any one of the embodiments 9-14, wherein the puncher (81) and the tongue guiding device are displaceable in relation to a tongue queue device (100).

16. The device as in any one of the embodiments 9-15, wherein device comprises a motor, such as an electric motor or a pneumatic motor, configured to drive the puncher (81) in the first direction (91), and preferably in a second direction (92), which is opposite to the first direction.

The invention claimed is:

1. A method for inserting a tongue in an insertion groove in a building panel by a device, wherein the method comprises: displacing a tongue guiding device in a first direction by displacing a puncher in the first direction, displacing a tongue in a space separating a first part and a second part of the tongue guiding device and into an insertion groove in a building panel by further displacing the puncher, displacing the puncher in the first direction, such that the puncher travels to a further location in the first direction than does the tongue guiding device, and displacing the first part of the tongue guiding device a longer distance in the first direction than the second part of the guiding device.

2. The method as claimed in claim 1, comprising displacing the puncher and the tongue guiding device relative to a tongue queue device.

3. The method as claimed in claim 1, comprising displacing the puncher in the first direction by a motor.

4. The method as claimed in claim 1, wherein the building panel is a first building panel, and the tongue is configured to lock the building panel to a second, adjacent, building panel after insertion of the tongue into the insertion groove of the first building panel.

5. The method as claimed in claim 4, wherein the tongue is configured to be partially inserted into a tongue groove of the second building panel after insertion of the tongue into the insertion groove of the first building panel.

6. The method as claimed in claim 1, comprising displacing the puncher and the tongue guiding device in a second direction, which is opposite the first direction, towards initial positions of the puncher and the tongue guiding device, respectively.

7. The method as claimed in claim 6, comprising displacing a tongue queue stopper by the tongue guiding device and feeding a new tongue.

8. The method as claimed in claim 7, comprising displacing the new tongue into the tongue guiding device when a first part of the tongue guiding device has reached, or is about to reach, its initial position.

9. A device for inserting a tongue in an inserting groove in a panel, wherein the device comprises a tongue guiding device, which is displaceable in a first direction, and a puncher, which is configured to displace a tongue in a space separating a first part and a second part, into an inserting groove in a panel, wherein the tongue guiding device configured to be displaced by the puncher, the puncher being displaceable in the first direction, such that the puncher is configured to travel to a further location in the first direction than is the tongue guiding device and wherein the first part of the tongue guiding device is displaceable a longer distance in the first direction than the second part of the guiding device.

10. The device as claimed in claim 9, wherein the device is configured such that a new tongue is displaced into the tongue guiding device when the first part of the tongue guiding device has reached, or is about to reach, its initial position.

11. The device as claimed in claim 9, wherein the puncher and the tongue guiding device are displaceable relative to a tongue queue device.

12. The device as claimed in claim 9, wherein the device comprises a motor configured to drive the puncher in the first direction.

13. The device as claimed in claim 9, wherein the puncher and the tongue guiding device are displaceable in a second direction, which is opposite the first direction, towards initial positions of the puncher and the tongue guiding device, respectively.

14. The device as claimed in claim 13, wherein the device comprises a displaceable tongue queue stopper for controlling a feeding of a new tongue.

* * * * *